United States Patent

[11] 3,601,640

[72] Inventor Katsumi Egawa
 Tokyo, Japan
[21] Appl. No. 16,063
[22] Filed Mar. 3, 1970
[45] Patented Aug. 24, 1971
[73] Assignee Computer Devices Corporation
 Santa Fe Springs, Calif.

[54] STATOR DESIGN FOR A STEPPING MOTOR
 3 Claims, 3 Drawing Figs.
[52] U.S. Cl............................................... 310/49,
 310/156
[51] Int. Cl............................................... H02k 37/00
[50] Field of Search.................................... 310/49, 156

[56] References Cited
 UNITED STATES PATENTS
3,206,623 9/1965 Snowdon..................... 310/162
3,293,459 12/1966 Kreuter et al................. 310/49
3,327,191 6/1967 Goto............................ 310/49 X
3,401,322 9/1968 O'Regan....................... 310/49 X Primary Examiner—D. X. Sliney
Attorney—Christie, Parker & Hale ABSTRACT: A stepping motor in which the stator is constructed from a plurality of laminations wherein each lamination is formed with a plurality of inwardly projecting pole portions. The inner edge of each pole has a number of equally spaced teeth which are offset relative to the centerline of the pole portion by one-fourth the pitch of the teeth. By assembling the stator with half the laminations reversed from the other half, the teeth in one-half are offset by one-half the pitch from the teeth in the other half of the stator stack.

PATENTED AUG 24 1971 3,601,640

INVENTOR.
KATSUMI EGAWA
BY
Christie, Parker, & Hale
ATTORNEYS

STATOR DESIGN FOR A STEPPING MOTOR

Field of the Invention

This invention relates to electrical stepping motors, and more particularly to an improved stator construction for a stepping motor.

Background of the Invention

Stepping motors of the synchronous-type are well known in which the stator is formed with salient poles, each pole having a series of teeth running parallel to the axis of rotation of the motor. A permanent magnet-type rotor is provided with two axially spaced pole members, each of which are provided with teeth around the outer periphery. Because the rotor is magnetized axially, one pole of the rotor is attracted to one end of a salient pole of the stator while the other pole of the rotor is repelled by the same salient pole of the stator. For this reason, it has been found desirable in the past to offset the teeth of one rotor pole relative to the other rotor pole in a circumferential direction an amount corresponding to half the pitch of the rotor teeth. This requires that the teeth in the respective pole members be formed before the rotor is assembled. The rotor is then assembled with the two pole pieces positioned with the teeth offset as described.

Summary of the Invention

The present invention is directed to an improved design and method of manufacture of a stepping motor in which the need for an offset of the rotor teeth of the two pole members of the rotor is avoided. This permits the rotor to be assembled before the teeth are formed. The teeth can then be formed on both pole pieces of the rotor at one time by standard gear hobbing techniques, resulting in equally spaced teeth extending the full axial length of both pole pieces. The operating effect achieved heretofore by offsetting the teeth of the two pole members of the rotor relative to each other has been achieved by modifying the shape of the stator. Each stator lamination is formed with equally spaced inwardly projecting salient pole portions, the inner end of each pole portion terminating in a concave arcuate edge. Teeth are formed along this edge having the same pitch as the teeth on the rotor. However, the teeth are offset from the centerline of the pole by an angular amount corresponding to one-fourth the pitch of the teeth. This stator core is assembled from a group of laminations with half the laminations being reversed so that the teeth of each pole for half the laminations are offset from the teeth for the other half of the laminations. The teeth over half of the axial length of the stator are offset from the teeth over the other half of the axial length of the stator by an amount precisely equal to half the pitch of the teeth.

Brief Description of the Drawings

For a better understanding of the invention reference should be had to the accompanying drawings wherein.

Detailed Description of the Invention

Figure 1:
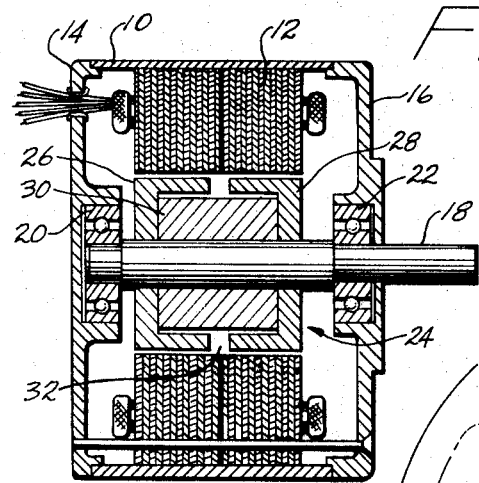
FIG. 1 is an axial section of the motor of the present invention.
Figure 3:
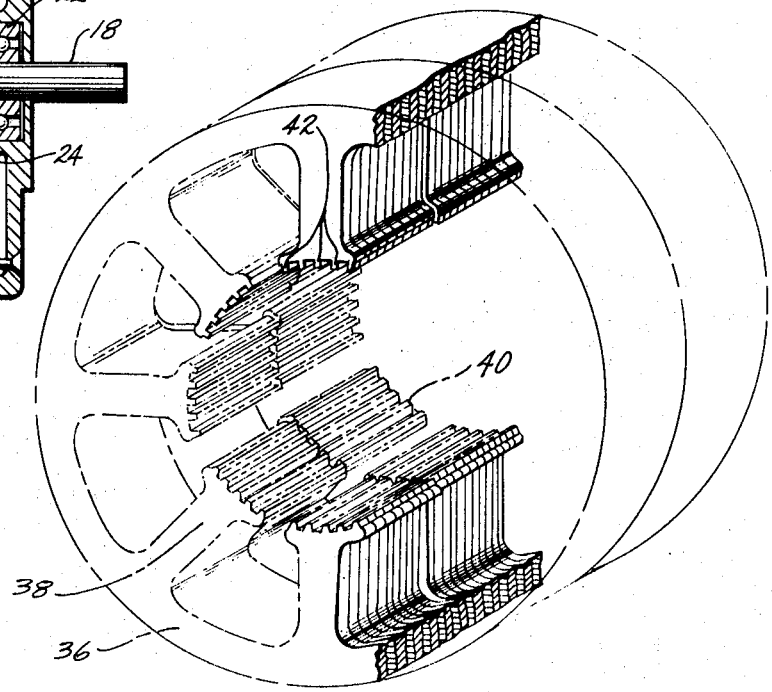
FIG. 3 is a prospective view partially cutaway of the stator core.

Referring to the drawings in detail, the numeral 10 indicates the outer cylindrical housing of the stepping motor in which is pressed or otherwise secured a laminated stator core 12. Housing end brackets 14 and 16 rotatably support the motor shaft 18 by means of suitable bearings 20 and 22. A cylindrical rotor is mounted on the shaft 18 and rotates within the stator core 12.

The rotor 24 is constructed of two cup-shaped members 26 and 28 which form the pole pieces of a cylindrically shaped permanent magnet 30. The pole pieces 26 and 28 and permanent magnet 30 are pressed on the shaft 18 and cemented or otherwise joined to form a strong unitary rotor assembly structure.

After assembly, the pole pieces 26 and 28 provide a substantially continuous outer cylindrical surface concentric with the axis of rotation of the shaft 18. The surface is broken by a small annular gap 32 between adjacent inner edges of the cup-shaped pole pieces 26 and 28. After assembly, the rotor is provided with a series of axially extending teeth indicated generally at 34, the teeth being equally spaced around the outer periphery of the rotor. By way of example only, for a stepping motor designed to advance in incremental steps of 1.8° of rotation, the periphery of the rotor may be formed with 50 equally spaced teeth, providing a pitch of 7.2°. The teeth in the respective pole pieces are axially aligned and so may be formed after the rotor is assembled by conventional gear hobbing techniques.

Figure 2:
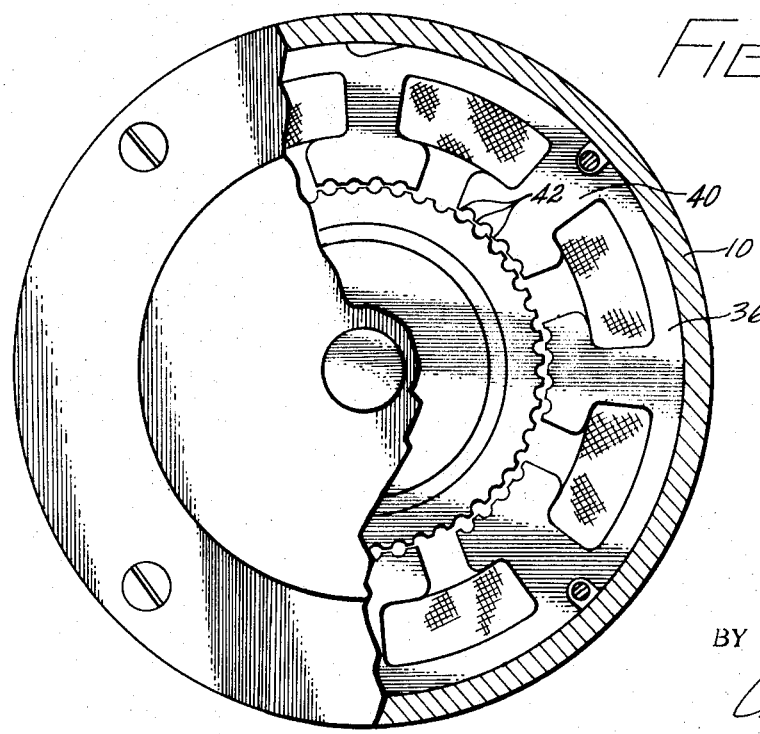
FIG. 2 is a partial cross-sectional view of the motor of FIG. 1.

The stator core 12 is constructed of a stack of thin laminations which are normally stamped out of sheets of magnetic steel in the manner of conventional electric motor construction. The laminations, which are all identical in shape, as best seen in FIG. 2, each comprise an outer continuous ring portion 36 with, for example, 8 inwardly projecting salient pole portions 38 having their centerlines spaced equally at angular increments of 45°. The inwardly projecting pole portions terminate in an arcuately shaped edge, the arcuate edges of the 8 pole portions lying on a common circle concentric with the outer ring 36.

The inner edge 40 of each pole portion 38 is notched to form five equally spaced projecting teeth 42. These teeth are formed, in the example described, with the same pitch as the teeth on the rotor, namely, a pitch of 7.2°. In this arrangement, it will be seen that if the teeth of the rotor are exactly aligned with the teeth of one of the salient poles of the stator, the teeth of the rotor are offset by one-fourth of the pitch of the teeth from the teeth at the next salient pole. The offset between the teeth of the pole and rotor is half the pitch for the salient pole at the 90° position and is aligned again at the salient pole at the 180° position.

Each salient pole of the stator core is provided with a coil winding, such as indicated at 44. Coils of alternate poles are connected together so as to be simultaneously energized, producing alternate north, south, north/south magnetic poles.

Considering for the moment only the south pole of the rotor, it will be apparent that the teeth of the rotor will tend to align with the teeth of the north pole of the stator. If the north and south poles of the stator are then advanced to the next set of four pole portions at the 45° position by energizing the corresponding coils, the rotor advances 1.8° to bring the teeth of the south pole of the rotor in alignment with the newly formed north poles of the stator. By alternately energizing the four coils of one set of four poles and the other set of four poles, the rotor can be caused to advance in incremental steps of 1.8°.

To make the teeth at the north pole of the rotor align with teeth of the stator, it has been the practice to shift the teeth of the north pole of the rotor by half the tooth pitch relative to the teeth of the south pole of the rotor. In this way when the teeth of the north pole are aligned with the teeth of the south poles of the stator, the teeth of the south pole of the rotor are aligned with the teeth of the north poles of the stator.

According to the reaching of the present invention this same condition of operation is achieved by a different design and method of construction which achieves the same result but with a much simpler and less expensive design. Specifically, according to the present invention, the stator lamination is designed with the position of the teeth 42 offset from the centerline of the salient pole by an angular distance of one-fourth of the tooth pitch, e.g. 1.8°. This provides an unsymmetrical lamination. The core is then assembled by stacking the laminations, with the laminations in one-half the stack being reversed from the laminations in the other half of the stack. The result is that with the poles formed by the laminations accurately aligned, the teeth formed by the laminations over one-half the stack are offset from the teeth formed by the laminations of the other half of the stack by an angular amount corresponding to one-half the pitch of the teeth, e.g., 3.6°.

This arrangement simplifies the construction of the motor in several ways. First, because the teeth and both poles of the rotor are aligned, they can be formed after the rotor is completely assembled, using conventional gear-cutting techniques. Second, a single shape of lamination is all that is required. The laminations are stacked with the poles aligned in conventional fashion and simply be reversing the laminations in one-half of the stack, the teeth on one-half of the stack can be offset from the teeth on the other half of the stack by a very accurately controllable angular amount. An indexing slot 46 may be formed in the outer edge of the ring portion 36 of the lamination for use in aligning the laminations in the stack. By making the slot unsymmetrical, as shown, an alignment fixture may be provided which insures that the laminations in the two halves of the stack are always properly positioned. Once the laminations are stacked, they may be bonded together to form a unitary stator core on which the stator windings can be placed in conventional manner. It will be noted that by the arrangement of the present invention, the pole portions of the stator are always aligned over the full axial length of the stator so as to provide unrestricted openings to which the coils pass between the poles.

IN THE CLAIMS:

1. A stepping motor comprising a stator having a plurality of salient poles, each pole terminating in an arcuate inner surface with the arcuate surfaces defining a cylindrical opening, and a cylindrical rotor rotatably positioned in said opening, the rotor including a permanent magnet and first and second cylindrical members forming the respective poles of said magnet, the first and second members having teeth around the periphery thereof with the teeth in the two members being axially aligned, and the arcuate surfaces of each of the salient poles of the stator having teeth projecting toward the teeth in the rotor, said teeth in each pole extending parallel to the rotational axis of the rotor the full length of the stator, the portion of each tooth extending half the length of the stator being offset from the portion extending the remaining half of the length, the offset of the teeth between the two halves of the stator being equal to one half the pitch of the teeth, the stator including a plurality of thin laminations joined in a stack, all of the laminations being identical in shape, each lamination having the teeth of each salient pole offset relative to the centerline of the pole by one-fourth the pitch of the teeth.

2. A stator core for a stepping motor comprising a plurality of thin, flat laminations of magnetic material, each lamination having an outer ring portion and a plurality of radially inwardly projecting equally spaced pole portions, the inner edge of the pole portions forming arcs of a common circle concentric with the ring portion, the inner edge having a plurality of radially projecting equally spaced teeth, the radial centerline of one of the teeth being offset from the radial centerline of the pole portion by an amount that is one-fourth of the spacing between adjacent teeth, and means securing the laminations in a stack with the centerlines of each of the pole portions of all the laminations being aligned with the laminations in one-half the stick having the teeth offset to the left and in the other half of the stack having the teeth offset to the right relative to the centerline of the pole portions.

3. The method of constructing a stator core for a stepping motor comprising the steps of forming a group of identically shaped laminations with each lamination having an outer ring portion and a plurality of radially inwardly projecting pole portions, with pole portions having a group of equally spaced teeth offset circumferentially relative to the pole portions, stacking the laminations with the pole portions aligned but with laminations in one-half the stack reversed from the laminations in the other half of the stack so that the teeth in one-half of the stack are displaced circumferentially by twice the amount of said offset relative to the teeth of the other half of the stack, and joining the laminations together to provide a rigid stator core structure.